Feb. 10, 1931. S. SORENSEN 1,792,402
CHAIN TONGS
Filed Feb. 4, 1929

Sam Sorensen Inventor

By Jesse R. Stone
Attorney

Patented Feb. 10, 1931

1,792,402

UNITED STATES PATENT OFFICE

SAM SORENSEN, OF HOUSTON, TEXAS, ASSIGNOR, BY MESNE ASSIGNMENTS, TO GEARENCH MANUFACTURING COMPANY, OF HOUSTON, TEXAS, A CORPORATION OF TEXAS

CHAIN TONGS

Application filed February 4, 1929. Serial No. 337,184.

My invention relates to chain tongs ordinarily employed in gripping and rotating pipe. It is adapted for use in all sizes of pipe but is particularly adaptable for use in oil field work where the larger sizes of pipe are to be screwed or unscrewed at the joints.

It is an object of my invention to provide a simplified construction of pipe tongs whereby a firm and uniform grip may be obtained upon the pipe for rotation thereof. I desire to grip the pipe on all sides by the chain portion of the tongs, thereby obtaining a uniform grip upon the pipe at all points.

I also desire to so mount the chain upon the handle of the tongs that the chain may be easily engaged or released from the point where it is latched to the body of the wrench.

Referring to the drawing herewith, Fig. 1 is a side view showing the same as attached to the pipe for operation.

Figure 1:
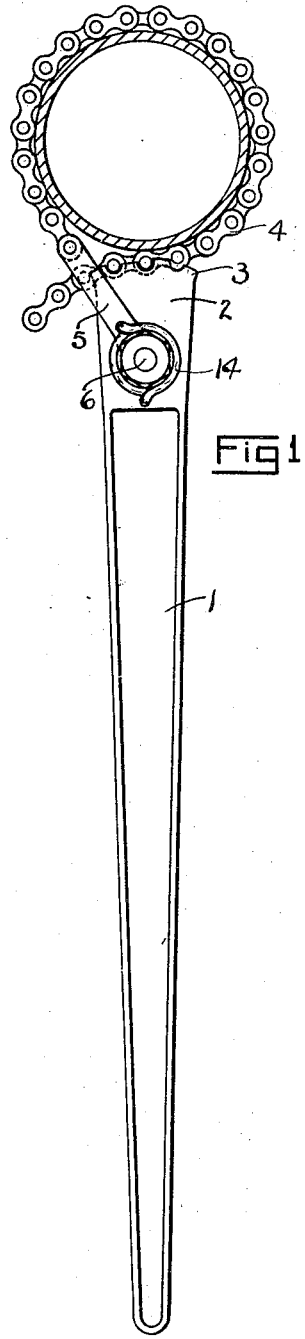
Figure 2:
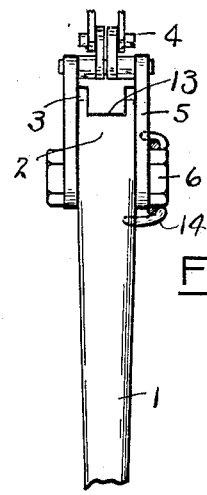
Fig. 2 is a broken edge view showing the head of the wrench with the chain broken off.

In the embodiment of the invention disclosed in Figs. 1 and 2, I employ a handle 1 of heavy metal construction, the forward end of which is formed into a head 2. The head is slightly wider than the handle which tapers toward the outer end. The forward end of the head 2 is formed with teeth 3 thereon. I have shown four such teeth formed at the forward end of the head but any desired number may be used. These teeth are spaced uniformly apart to engage within the links of the chain 4.

The chain is attached to a forked yoke 5, which engages on opposite sides of the head 2, and is pivotally secured thereto upon a transverse pin 6. The chain may be of a construction employed on pipe wrenches in which the pins extend beyond the links and are adapted to engage between the teeth 3 whereby a pull may be exerted on the chain, the links being adapted to pass into the space 13 between the teeth 3 as seen in Fig. 2.

When the device is applied to the pipe the chain is wound tightly about the pipe in the desired direction, and it will be obvious on inspection that the chain may be wound about the pipe equally well in either direction, depending upon the direction in which the pipe is to be rotated. The free end of the chain, after being wrapped about the pipe, is drawn into engagement with the teeth 3 on the forward end of the head, the loose end of the chain being threaded through the yoke 5, as shown.

With the chain engaged as shown in Fig. 1, the handle will be rotated to the left so as to exert a pull in both directions upon the chain. The pull at the free end of the chain is accomplished by the movement of the teeth relative to the pipe and moving the end of the chain to exert a tension thereon pulling it firmly against the pipe from that side. The movement of the handle relative to the pipe also exerts a pull upon the yoke 5 and the attached end of the chain so that the chain is brought tightly against the pipe on all sides to firmly grip the same and cause the pipe to be rotated with the pipe tongs.

I have shown a small spring 14 in Figs. 1 and 2 as encircling the pin 6 and having opposite ends engaging the head 2 and the yoke 5 so that the yoke will normally stand in a straight forward position.

Figure 3:
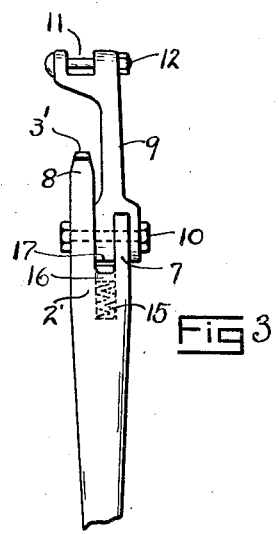
Fig. 3 is a view similar to Fig. 2 but showing a slightly different embodiment of the invention.

This structure shown in Fig. 1 may be further simplified for ease in handling the chain by employing the structure shown in Fig. 3. The head 2' of the wrench handle is offset on one side to provide a short attaching leg 7. The upper end of the handle at 8 is formed arcuate and has a series of teeth 3 thereon, as in the other embodiment.

Th chain is attached to an elongated link member 9, which is forked to engage the leg 7 of the head and a thru bolt 10 is employed to secure the said link member pivotally to the head. The upper end of the link member 9 is extended over the end 8 of the head and is formed to provide attachment at 11 for the chain 4, which will be of the same construction as shown in Fig. 1. The pin 12 extending across the forked end of the link member 9 secures the chain thereto for operation. In the form of the construction I have shown a small spring 15 pressing against a block 16 which in turn contacts the end 17 of the link member 9 to assist in maintaining it in a straight forward position. The teeth 3' of this figure are shown as adapted to enter the links of the chain but any desired form may be used.

The operation of this embodiment will be identical with that shown in the Fig. 1 embodiment. The tooth end of the head 8 is, however, open so that the chain may be more easily swung in to engage with the teeth 3' upon the head. It will not be necessary, as in the Fig. 1 embodiment, to thread the loose end of the chain through the yoke 5. This is a greater convenience in use, due to the fact that the chain may be engaged more quickly with the teeth on the head when emergency arises and is a matter of convenience only.

The advantages of this type of construction lie in the fact that the device is extremely simple and has a minimum number of parts. It allows a chain to engage the pipe on all sides without danger of mutilation of the pipe and as the pull is exerted upon the chain equally at both ends, a uniform and even engagement of the chain with the pipe avoids danger of mutilation and assures a firm and uniform grip upon the pipe.

What I claim as new and desire to protect by Letters Patent is:

Pipe tongs comprising a handle, a head thereon, a lateral leg on said head, a link member pivoted to said head and leg, a toothed forward end on said head adjacent said link, and a chain on said link adapted to detachably engage said toothed end.

In testimony whereof I hereunto affix my signature this 11th day of January A. D. 1929.

SAM SORENSEN.